(12) United States Patent
Hamann et al.

(10) Patent No.: US 10,007,999 B2
(45) Date of Patent: Jun. 26, 2018

(54) METHOD OF SOLAR POWER PREDICTION

(71) Applicant: International Business Machines Corporation, Armonk, NY (US)

(72) Inventors: Hendrik F. Hamann, Yorktown Heights, NY (US); Levente Klein, Tuckahoe, NY (US); Siyuan Lu, Yorktown Heights, NY (US); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/233,412

(22) Filed: Aug. 10, 2016

(65) Prior Publication Data

US 2018/0047170 A1 Feb. 15, 2018

(51) Int. Cl.
*G06K 9/00* (2006.01)
*G06T 7/20* (2017.01)
*H04N 5/372* (2011.01)

(52) U.S. Cl.
CPC ............... *G06T 7/20* (2013.01); *H04N 5/372* (2013.01); *G06T 2207/30192* (2013.01); *G06T 2207/30241* (2013.01)

(58) Field of Classification Search
CPC ............. G06T 7/20; G06T 2207/30192; G06T 2207/30241; H04N 5/372
USPC .............. 382/107, 100; 33/1 DD; 60/641.15, 60/641.8; 126/572, 617, 633, 621; 136/246; 359/265, 273, 275; 374/109; 702/3
See application file for complete search history.

(56) References Cited

U.S. PATENT DOCUMENTS

| 4,424,804 A | * | 1/1984 | Lee ........................... F24J 2/34 126/572 |
| 5,884,226 A | | 3/1999 | Anderson et al. |
| 6,425,248 B1 | * | 7/2002 | Tonomura ............... H02J 3/008 60/641.15 |
| 7,305,983 B1 | | 12/2007 | Meder et al. |

(Continued)

OTHER PUBLICATIONS

E.W. Law et al., "Direct normal irradiance forecasting and its application to concentrated solar thermal output forecasting—A review," Solar Energy, vol. 108, Oct. 2014, pp. 287-307.

(Continued)

*Primary Examiner* — Aaron W Carter
(74) *Attorney, Agent, or Firm* — Vazken Alexanian; Michael J. Chang, LLC

(57) ABSTRACT

Techniques for estimating direct and diffuse sunlight reaching a location as a function of time using color whole sky images are provided. In one aspect, a method for forecasting solar insolation is provided that includes the steps of: obtaining color whole sky images using a digital camera which are taken at different times, and wherein an image of a solar disk is present in at least one of the color whole sky images; creating sky transparency images from the color whole sky images; determining atmospheric solar scattering based on a width of the solar disk in the color whole sky images; determining cloud motion trajectories from a time series of the sky transparency images; and calculating the solar insolation as a function of time using the sky transparency, the atmospheric solar scattering, and the cloud motion trajectories. A system for forecasting solar insolation is also provided.

20 Claims, 5 Drawing Sheets

(56) References Cited

U.S. PATENT DOCUMENTS

| | | | |
|---|---|---|---|
| 7,481,576 B2 * | 1/2009 | Ahmad | G01W 1/17 |
| | | | 374/109 |
| 7,580,817 B2 | 8/2009 | Bing | |
| 8,101,848 B2 * | 1/2012 | Kelly | F24J 2/38 |
| | | | 136/246 |
| 8,103,055 B2 | 1/2012 | Stoddart et al. | |
| 8,295,989 B2 | 10/2012 | Rettger et al. | |
| 9,201,228 B1 * | 12/2015 | Steinmeyer | G02B 19/0009 |
| 9,366,458 B2 * | 6/2016 | Wasyluk | F22B 1/006 |
| 2010/0198420 A1 | 8/2010 | Rettger et al. | |
| 2011/0085698 A1 * | 4/2011 | Tillotson | G01W 1/00 |
| | | | 382/103 |
| 2012/0155704 A1 | 6/2012 | Williams et al. | |
| 2014/0083413 A1 * | 3/2014 | Bibi | G01W 1/02 |
| | | | 126/601 |
| 2014/0278107 A1 | 9/2014 | Kerrigan et al. | |
| 2014/0278108 A1 * | 9/2014 | Kerrigan | G01W 1/10 |
| | | | 702/3 |
| 2014/0320607 A1 * | 10/2014 | Hamann | H04N 5/23296 |
| | | | 348/47 |
| 2015/0161779 A1 | 6/2015 | Hamann et al. | |
| 2015/0186904 A1 | 7/2015 | Guha et al. | |
| 2016/0218551 A1 * | 7/2016 | Sano | H02J 7/35 |
| 2017/0031056 A1 * | 2/2017 | Vega-Avila | G01W 1/12 |
| 2017/0351970 A1 * | 12/2017 | Abedini | G01W 1/10 |
| 2018/0013968 A1 * | 1/2018 | Hamann | H04N 5/3591 |
| 2018/0019594 A1 * | 1/2018 | Min | H02J 3/383 |

OTHER PUBLICATIONS

E. Lorenz et al., "Irradiance Forecasting for the Power Prediction of Grid-Connected Photovoltaic Systems," IEEE Journal of Selected Topics in Applied Earth Observations and Remote Sensing, vol. 2, No. 1, Mar. 2009, pp. 2-10.

R. Marquez et al., "Intra-hour DNI forecasting based on cloud tracking image analysis." Solar Energy, vol. 91, May 2013, pp. 327-336.

R. Frouin et al., "A technique for global monitoring of net solar irradiance at the ocean surface. Part I: Model," Journal of Applied Meteorology, vol. 31, No. 9, Sep. 1992, pp. 1056-1066.

* cited by examiner

METHOD OF SOLAR POWER PREDICTION

STATEMENT OF GOVERNMENT RIGHTS

This invention was made with Government support under Contract number DE-EE0006017 awarded by Department of Energy. The Government has certain rights in this invention.

FIELD OF THE INVENTION

The present invention relates to forecasting solar insolation, and more particularly, to techniques for estimating direct and diffuse sunlight reaching a location as a function of time using color whole sky images.

BACKGROUND OF THE INVENTION

Solar power production continues to increase in terms of the number of plants and total plant size. As plant size approaches gigawatt levels, it is increasingly important to be able to predict the power output of the solar plant versus time in order to stabilize the grid. Interruptions in solar output due to weather conditions must be compensated by other forms of power production in order to match the grid supply to the power load.

Therefore, techniques for accurate short and long term solar forecasting would be desirable.

SUMMARY OF THE INVENTION

The present invention provides techniques for estimating direct and diffuse sunlight reaching a location as a function of time using color whole sky images. In one aspect of the invention, a method for forecasting solar insolation is provided. The method includes the steps of: obtaining color whole sky images using a digital camera, wherein the color whole sky images are taken at different times, and wherein an image of a solar disk is present in at least one of the color whole sky images; creating sky transparency images from the color whole sky images; determining atmospheric solar scattering based on a width of the solar disk in the color whole sky images; determining cloud motion trajectories from a time series of the sky transparency images; and calculating the solar insolation as a function of time using the sky transparency, the atmospheric solar scattering, and the cloud motion trajectories.

In another aspect of the invention, a system for forecasting solar insolation is provided. The system includes a sky camera system comprising at least one digital camera configured to obtain color whole sky images taken at different times, wherein an image of a solar disk is present in at least one of the color whole sky images; and a computation facility configured to obtain the color whole sky images from the sky camera system, create sky transparency images from the color whole sky images, determine atmospheric solar scattering based on a width of the solar disk in the color whole sky images, determine cloud motion trajectories from a time series of the sky transparency images, and calculate the solar insolation as a function of time using the sky transparency, the atmospheric solar scattering, and the cloud motion trajectories.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for ground based optical observation for use in forecasting solar insolation and local solar power production using whole sky imaging from a digital camera with imaging optics which allows the estimation of direct and diffuse sunlight reaching a location as a function of time. The process employs a sequence of at least two whole sky images taken at a known exposure to estimate the present and projected incident solar power. This forecast can be used with a known solar plant model to predict total power output from the solar plant.

Figure 1:
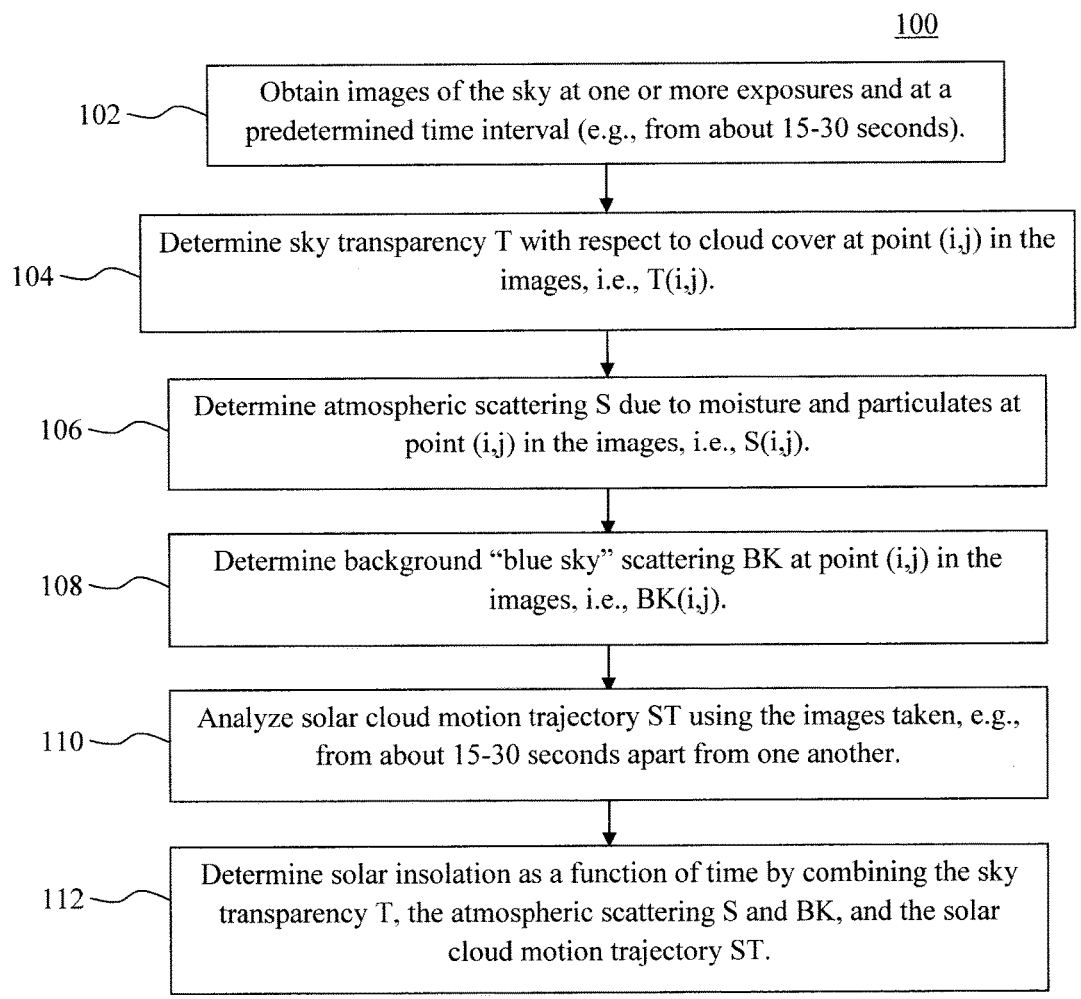
FIG. 1 is a diagram illustrating an exemplary methodology for forecasting local solar insolation according to an embodiment of the present invention.

An overview of the present techniques is now provided by way of reference to FIG. 1 which provides an exemplary methodology 100 for forecasting local solar insolation. The term "insolation," as used herein refers generally to any amount of solar radiation reaching a given area. "Local" solar insolation refers to the amount of sunlight incident in the immediate vicinity (e.g., within a few hundred meters of the sensor).

In step 102, color whole sky images are obtained. The images are taken at one or more exposures and/or at a predetermined time interval apart from one another. According to an exemplary embodiment, in step 102 at least one first (i.e., image 1) and at least one second (i.e., image 2) color whole sky images are obtained, wherein the images are taken with a predetermined exposure time (e.g., from about 0.1 milliseconds (ms) to about 0.5 ms, and ranges therebetween), and wherein the at least one first whole sky image and the at least one second whole sky image are taken at from about 15 seconds to about 30 seconds, and ranges therebetween, apart from one another. As will be described in detail below, images taken at different times can be used to track the motion of clouds in the sky. For convenience, in one exemplary embodiment, several images are taken at each time interval at different exposures. Exposure, or the amount of light per unit area reaching the image sensor, can be regulated, e.g., using shutter speed and/or lens aperture settings on the camera.

Preferably, at least one of the color whole sky images taken in step 102 includes an image of the Sun (also referred to herein as a "solar disk"). As will be described in detail below, the size (i.e., width) of the solar disk in the color whole sky images is used to determine atmospheric solar scattering based, for example, on past/historic color whole sky images for which solar disk width and irradiance have been correlated.

In one exemplary embodiment, the images are obtained from a sky camera system which includes a low bloom, e.g., 1.5 megapixel array, charge coupled device (CCD) digital camera or a charge injection device (CID) digital camera fitted with curved optics to enable whole sky imaging. As is known in the art, a CCD camera is a camera with a CCD photon detector—a semiconductor sensor device with an array of light-sensitive regions that capture and store image information in the form of localized electrical charge that varies with incident light intensity. CCD cameras are commercially available, for example, from Nikon, Inc., Melville, N.Y. A CID camera also employs a semiconductor sensor for capturing an image. However, unlike CCD technology, readout of the data from a CID array is non-destructive because charge remains intact in the pixels (whereas with CCD technology the data stored on the sensors is erased during readout). CID cameras are commercially available, for example, from Thermo Fisher Scientific, Inc., Waltham, Mass. The camera system is preferably encased in a weatherproof enclosure which permits it to be located outdoors for continuous year-round use.

In one exemplary embodiment, the curved optics includes a fisheye lens affixed to the digital camera. A fisheye lens is an ultra-wide angle lens that can be used to capture wide panoramic or hemispherical images. According to an exemplary embodiment, the present camera system employs a commercially available 1.4 mm f/1.4 fisheye lens such as a Fujinon fisheye lens available from Fujifilm, Tokyo, Japan.

Alternatively, in another exemplary embodiment, the curved optics includes a hemispherical mirror that is positioned to reflect whole sky images to the digital camera. For instance, a hemispherical mirror facing skyward will reflect a whole sky image which can be captured by the digital camera. The use of fisheye lens and hemispherical mirrors to capture whole sky images is described, for example, in U.S. Patent Application Publication Number 2015/0161779 by Hamann et al., entitled "Large-Area Monitoring Using Infrared Imaging System," the contents of which are incorporated by reference as if fully set forth herein.

The images obtained from the camera system will be processed to produce a solar insolation forecast. For instance, in step 104, the whole sky images are used to determine the transparency T of the sky with respect to cloud cover at point (i,j) in the images, i.e., T(i,j). See FIGS. 2A and 2B.

A color image from a digital camera has a red, a green, and a blue channel. According to an exemplary embodiment, the transparency of the sky with respect to cloud cover is determined as a normalized difference between at least two color channels in one or more of the images (obtained in step 102). Namely, it has been found herein that the colors in a color digital image associated with a given pixel roughly correspond to red, green and blue portions of the visible light spectrum. It is also found herein that the blue and green channel intensities at a given point in the image converge to a similar value in portions of the sky that are opaque (not transparent). Significantly less convergence is observed relative to the red channel with respect to either the green or blue channels. Based on these observations, an estimation function is constructed in step 104 that combines the intensity values for the three (i.e., red, green, and blue) color channels as follows:

$$T(i,j)=A_{ij}*((B(i,j)-G(i,j))/(B(i,j)+G(i,j))) \qquad (1)$$

wherein:
T(i,j) is the sky transparency estimate at point (i,j),
B(i,j) is an intensity of the blue color channel at point (i,j),
G(i,j) is an intensity of the green channel at point (i,j), and
$A_{ij}$ is a fixed constant at the point (i,j).

Each point (i,j) represents a pixel in the digital image. Thus, Equation 1 looks at the blue and green value at each pixel. In one exemplary embodiment, the constant $A_{ij}$ has a value of approximately 4.3. In an alternate embodiment, the constant is adjusted for spatial variation in the image. In practice this constant can be determined by experimentation or alternately set empirically by observation.

By way of example only, as provided above, a first whole sky image—image 1 and a second whole sky image—image 2 are obtained in step 102. Image 1 and image 2 are taken at different times (e.g., image 1 and image 2 are taken at from about 15 seconds to about 30 seconds, and ranges therebetween, apart from one another). The transparency of the sky with respect to cloud cover (as per step 104) may be determined, e.g., via Equation 1, for either (or both) of image 1 and image 2 from step 102. According to an exemplary embodiment, the function in Equation 1 is applied to both image 1 and image 2. The image(s) resulting from applying the function in Equation 1 to image 1 and/or image 2 are referred to herein as "sky transparency images." See, for example, FIG. 2B—described below. Thus, when the transparency function in Equation 1 is applied to both image 1 and image 2, then multiple sky transparency images are obtained of the sky at different times (since image 1 and image 2 were taken at different times—see above).

Figures 2A, 2B:
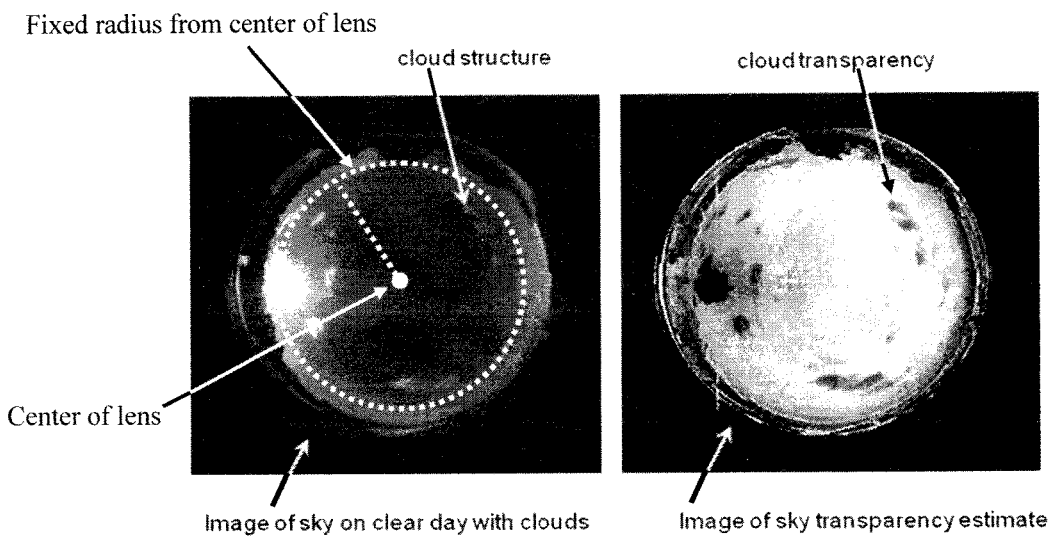
FIG. 2A is a sky transparency image of the sky on a clear day with clouds according to an embodiment of the present invention.
FIG. 2B is an image of a sky transparency estimate according to an embodiment of the present invention.

Equation 1 provides a sky transparency estimate of between 0.0 and 1.0. The sky transparency image (labeled "Image of sky transparency estimate") in FIG. 2B illustrates this function. Basically, the function in Equation 1 is used to convert the pixel values from the image in FIG. 2A to produce the sky transparency image in FIG. 2B. Whereas the whole sky images from step 102 are color images, the sky transparency image is a black and white representation where the pixel values are replaced by a transparency value (calculated via Equation 1) wherein areas of higher transparency (e.g., clear parts of the sky) appear lighter, and areas of lower transparency (e.g., areas covered with clouds) appear darker or black.

What is of interest is the sky that extends from horizon to horizon. Thus, areas of the image(s) that do not correspond to the sky (e.g., areas of landmass) are excluded from consideration. This can be done simply by considering only those points within a fixed radius from a point in the image corresponding to the center of the lens when the camera is oriented with the lens axis normal to the earth. See, for example, FIG. 2A.

Figure 4:
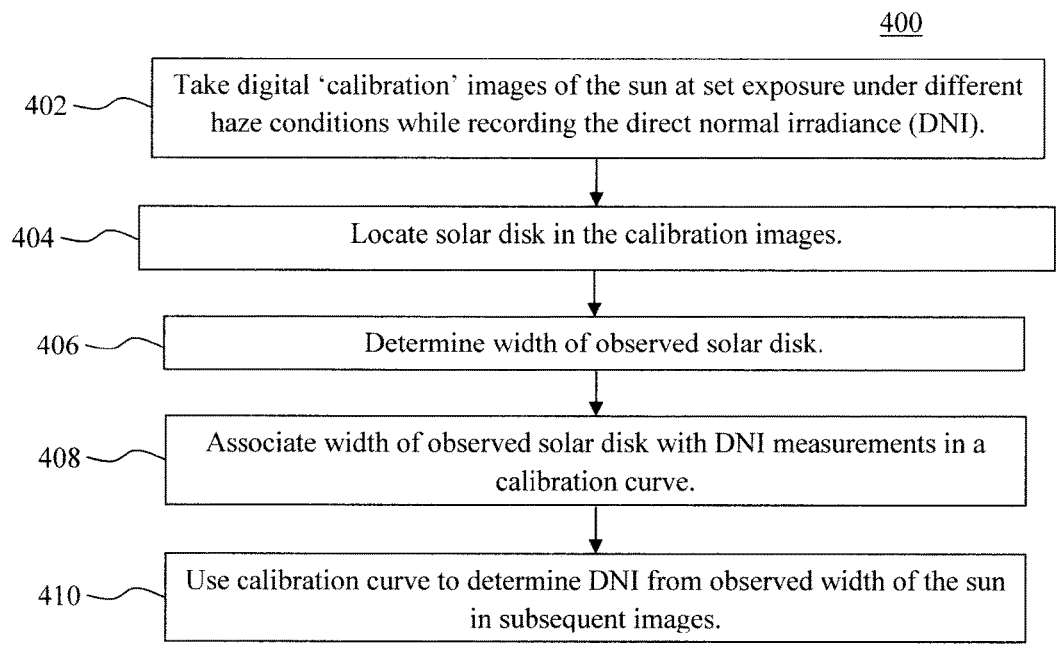
FIG. 4 is a diagram illustrating an exemplary methodology for determining atmospheric solar scattering according to an embodiment of the present invention.

Next, an estimate of the general scattering properties of the atmosphere is carried out. Specifically, in step 106, atmospheric scattering S due to moisture and particulates at point (i,j) in the images is determined, i.e., S(i,j). It has been found herein that the solar disc (the sun) appears larger than its actual size in an atmosphere where moisture and particulates are present (due, e.g., to the light scattering effects of the moisture and particulates). This phenomenon is leveraged herein to determine atmospheric solar scattering. Namely, as will be described in detail below, according to an exemplary embodiment atmospheric solar scattering is computed based on a width of the observed solar disk in an image (taken at a known exposure time) as compared to past observations of the width of the solar disk (in images taken at the same known exposure time) and direct normal irradiance (DNI) measurements made during those past observations. See, for example, FIG. 4—described below.

Figure 3:
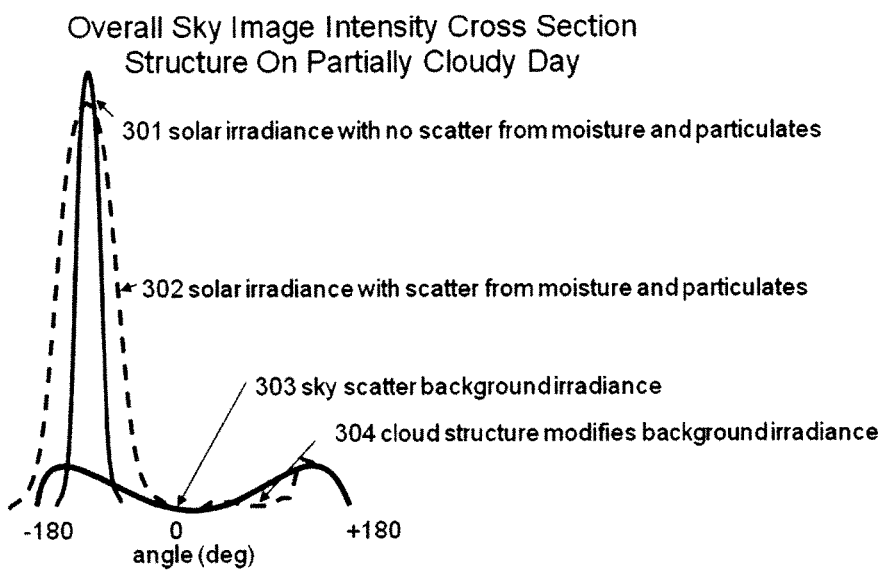
FIG. 3 is a diagram illustrating solar irradiance intensity profiles from a cross section of a whole sky image according to an embodiment of the present invention.

FIG. 3 is a diagram illustrating a collection of components representing solar irradiance intensity profiles taken through a cross section of a whole sky image. Curve 301 in FIG. 3 represents the intensity profile of the solar image under perfectly clear sky conditions (i.e., the solar irradiance with no scatter effect from moisture and particulates).

Curve 302 in FIG. 3 represents the intensity profile of the solar image under hazy sky conditions. The term "hazy," as used herein, refers to the presence of moisture and/or particulates in the atmosphere. Thus, curve 302 represents the intensity profile of the solar image where there is scattering of the solar irradiance from moisture and particulates. As can be seen from comparing curve 301 and curve 302, the peak intensity of solar irradiance is reduced and the envelope broadened due to the scattering of moisture and particulates. This function can be approximated as a Gaussian.

The solar image measures solar irradiance as a series of pixel intensity values. Because solar intensity is very high, a solar image is typically saturated in most direct digital images (i.e., pixel intensity is at a maximum irradiance that can be measured for a given camera setting). Further, the pixels in a digital camera collect photons which are converted into an electrical charge. When imaging a bright object, such as the sun, the charge from an excess of photons can overflow to surrounding pixels—brightening or overexposing them. This effect is known as "blooming." It is however possible to calibrate a given camera/lens/enclosure system at a known (predefined) exposure that allows the sun to be observed with minimal blooming. By way of this calibration process, one may compute a function for atmospheric solar scattering. See FIG. 4—which provides an exemplary methodology 400 for determining atmospheric solar scattering. In methodology 400, the color whole sky images are compared with past color whole sky images for which a width of a solar disk observed in the past color whole sky images has been correlated with direct normal irradiance (DNI) to determine the atmospheric solar scattering based on the width of the solar disk in the color whole sky images.

Namely, in step 402, digital images of the sun under different haze conditions (i.e., at different levels of moisture and/or particulates in the atmosphere) can be taken while simultaneously recording the DNI using a calibrated instrument. Direct normal irradiance (DNI) is the amount of solar radiation received per unit area by a surface normal to rays from the sun. These images taken in step 402 will be used to calibrate the camera system for different haze conditions. Thus, these 'calibration images' may be obtained (and DNI measurements made) over a period of time prior to when methodology 100 (of FIG. 1) is performed. Further, the images in step 402 should be taken with the same exposure time. That way when a subsequent image is taken, that same exposure time may be employed so that a direct comparison can be made between the image and the calibration images. According to an exemplary embodiment, a 0.001 millisecond (ms) exposure time is employed.

The result from step 402 is a set of calibration images and DNI measurements associated with those images. As provided above, due to the scattering effect it is assumed that the width of the solar disc (the sun) will be different since the images were taken under different haze conditions. The width of the solar disk can be ascertained (see below) and correlated with the DNI measurement made when the corresponding image was taken. As a result, a collection of solar disk width/DNI measurements can be obtained for the given exposure.

Namely, in step 404 the calibration images are analyzed by locating a solar disk (i.e., the sun) in the images by looking at its brightest point with blob detection and centroid calculation. Blob detection and centroid location techniques are described, for example, in U.S. Pat. No. 8,103,055 issued to Stoddart et al., entitled "Detection of Blobs in Images," the contents of which are incorporated by reference as if fully set forth herein. The solar position (i.e., the location of the sun in the images) may also be determined based on the time of day and the expected location of the sun at that time.

In step 406, a width of the observed solar disk is determined. As provided above, due to scattering the sun appears larger than its actual size. Accordingly, the observed width of the sun in the images (i.e., the width of the sun as it appears in the images) will vary depending on the haze conditions during which the images were taken. According to an exemplary embodiment, an estimate of the full width at half maximum (FWHM) of the observed blob is performed.

In step 408, the width values of the solar disk obtained from the images are associated with the DNI measurements (from step 402) in a calibration curve. This calibration curve may then be used to determine a DNI value for subsequent images based on the width of the solar disk in those subsequent images.

Namely, in 410 observation of the sun in subsequent images may then be used to estimate the unobstructed DNI by acquiring an image of the sky at the same predefined exposure (see above), estimating the FWHM of the solar image (as described above), and then computing the DNI using the aforementioned calibration curve and interpolating.

Referring back to FIG. 1, when determining atmospheric scattering the scattering due to molecules of the air in the atmosphere needs to be taken into account. This is done via a background BK scatter function which is determined in step 108 of methodology 100. The solid line 303 in FIG. 3 represents the sky background BK scatter function at point (i,j) in the images. This is the "blue sky" scatter on a cloudless day. Blue sky scatter, also commonly referred to as Rayleigh scattering, describes how sunlight scattering by air molecules in the atmosphere causes light at predominately the blue end of the visible spectrum to reach the Earth's surface giving the sky its blue appearance. According to an exemplary embodiment, background scatter is estimated as a radially symmetric curve that is computed and stored by direct observation of the image profile from the lens center to the 180 degree position with the sun at the opposite side of the image. See, for example, FIG. 3 where an angle of zero (0) degrees corresponds to the center of the lens, and sky scatter background (BK) irradiance is shown for an image profile from an angle of −180 degrees to +180 degrees relative to the center of the lens. As also shown in FIG. 3 at 304, the cloud structure modifies the background irradiance.

So far—functions for determining the sky transparency T, the atmospheric scattering S due to moisture and particulates, and the background BK scattering for points in the image(s) have been provided as per steps 104, 106, and 108 of methodology 100, respectively. Next, as per step 110, the motion of the clouds is determined. As highlighted above, this is done by analyzing two (or more) of the images from step 102 taken at different times, for example, images taken from about 15 seconds to about 30 seconds, and ranges therebetween, apart from one another. Specifically, cloud motion trajectories are computed herein based on the correlation of one of the whole sky images from step 102 (e.g., image 1) with another of the whole sky images from step 102 (e.g., image 2).

Figure 5:
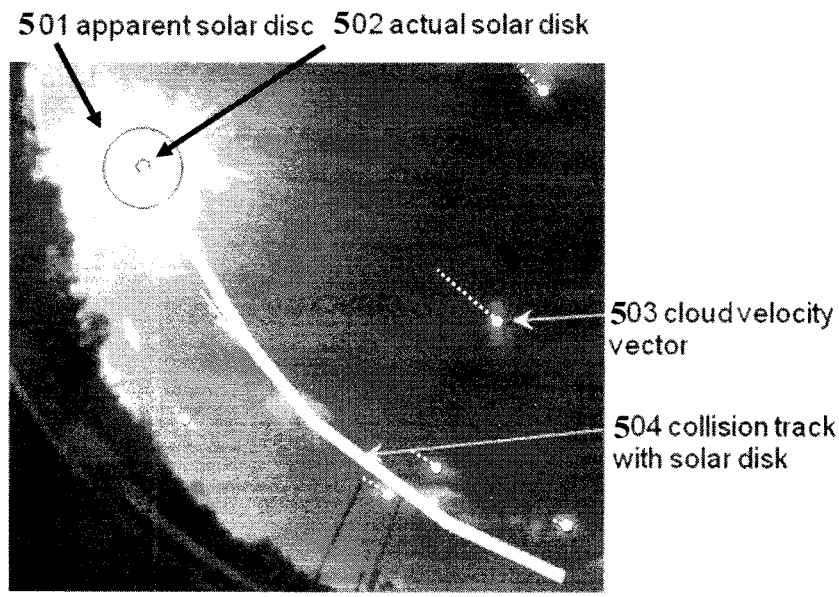
FIG. 5 is a diagram illustrating cloud trajectory estimation and collision expectation with solar disk according to an embodiment of the present invention.

As provided above, the transparency function in Equation 1 may be used to obtain multiple sky transparency images of the sky at different times (e.g., from about 15 to about 30 seconds, and ranges therebetween, apart from one another). According to an exemplary embodiment, it is these time series transparency images that are analyzed in step 110 to compute the cloud motion trajectories. In that case, the calculation is performed by locating minima in the sky transparency images and then correlating these minima from the earlier sky transparency image to the later sky transparency image in the time series. This correlation yields the displacement of each minimum from one image to the next and the corresponding velocity of the minimum. In practice the minima correspond to clouds. See, for example, FIG. 5. FIG. 5 shows an image of the sky with cloud velocity vectors 503 shown as dashed lines. Examination of the cloud velocity vectors allows a flow trajectory to be computed in the neighborhood of the sun. This trajectory 504 is shown in FIG. 5 and represents the region of sky where the presence of a cloud will result in the cloud passing between the sun and the observer at a future time corresponding to a distance the cloud is from the sun's position along the track 504. Track 504 can be expressed as a set of coordinates as a function of time. Further, as shown in FIG. 5, in the image the sun appears larger than its actual size. See the apparent solar disc 501 as compared to actual solar disk 502. As described above, this can be the result of the light scattering effects of moisture and particulates in the atmosphere.

Thus by overlaying the solar cloud motion trajectory (abbreviated herein as "solar track" or simply as "ST") on the sky transparency function developed in step 104, the future time variation in solar intensity can be computed as:

$$I0(t)=T(ST(t)) \quad (2)$$

where:
T(i,j) is the sky transparency estimate at point (i,j) (from step 104)
I0($t$) is solar intensity as a function of time (uncorrected for haze), and
ST(t) is a function corresponding to the solar track that returns coordinates versus time.
Uncorrected for haze means that I0 represents the solar insolation calculated based on the sky transparency and the solar cloud motion trajectory. Atmospheric solar scattering has not yet been taken into account. Atmospheric solar scattering will be addressed in the next step.

Finally, in step 112, the components computed above (i.e., the whole sky transparency—step 104, the atmospheric scattering—steps 106 and 108, and the solar track—step 110) can be combined to generate a time variable estimate of the whole sky insolation I versus position (i,j) and time (t):

$$I(i,j,t)=S(i,j)*I0(t)+BK(i,j) \quad (3)$$

This estimate is particularly suited to clear to partially cloudy days. On days where there is full cloud cover, the amount of light reaching the earth is less that $\frac{1}{20}^{th}$ of full sun and not enough to power an inverter.

Figure 6:
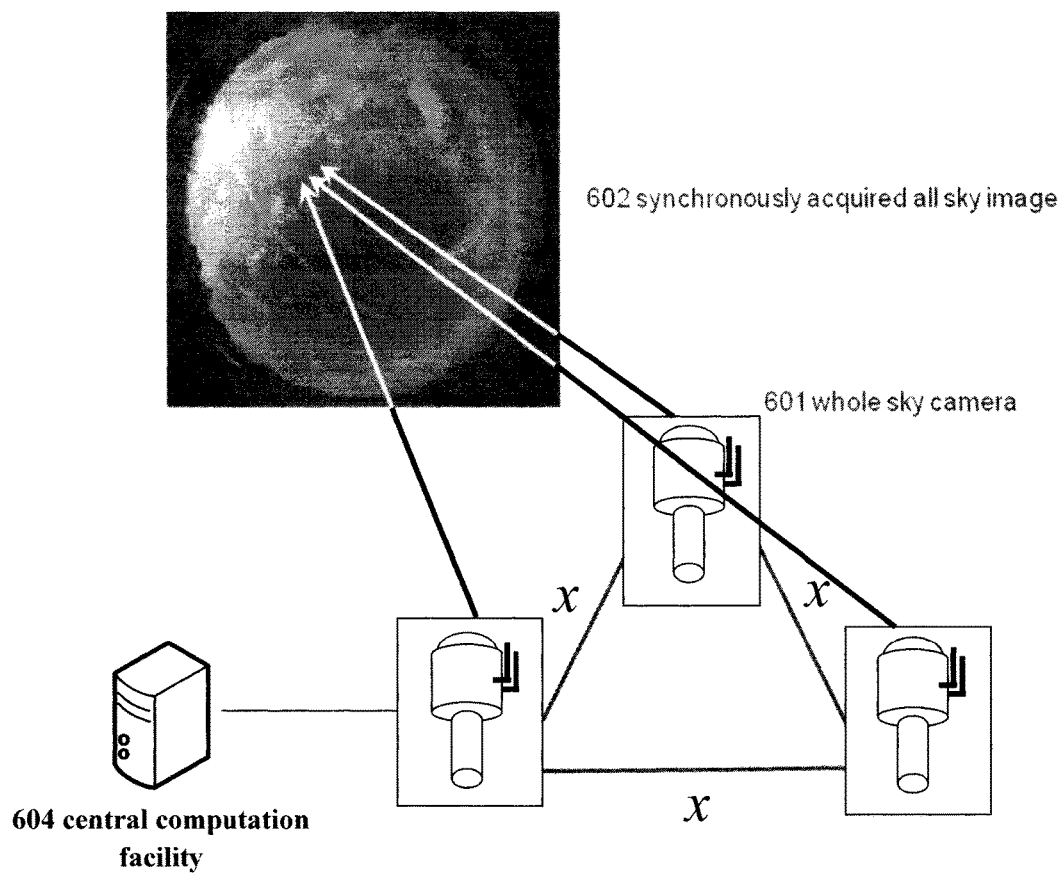
FIG. 6 is a diagram illustrating an exemplary multiple sky camera system for cloud altitude measurement according to an embodiment of the present invention.

In the above description mention is made generically to a sky camera system. Embodiments are anticipated herein where the sky camera system includes multiple whole sky cameras which can serve to extend the region over which the present solar insolation forecast applies. See, for example, FIG. 6. For illustrative purposes only three sky cameras 601 are employed in the exemplary sky camera system of FIG. 6.

In one exemplary embodiment, the three sky cameras 601 are located at a separation distance x of from about 0.15 kilometers to about 0.30 kilometers, and ranges therebetween, e.g., about 0.25 kilometers, apart from one another. Each camera synchronously (i.e., at the same time) acquires an all sky image 602 which is then relayed to a central computation facility 604 which performs, for example, the above-described solar insolation computations. An exemplary apparatus that may serve as, or be part of, the central computation facility is provided in FIG. 7—described below. The three images (obtained from the three sky cameras) are first aligned and then correlated to each other in the same manner as described in conjunction with the description of step 110 of methodology 100 above to determine the displacement of a given cloud in each image relative to each other. Using these displacements and the known distance of separation between each of the sky cameras, an estimate of the cloud altitude can be computed by known geometric methods.

Image alignment is performed at least once by using the known center of the field and sun position to compute relative rotation and offset of one camera image relative to other camera images. In one embodiment, each image is rotated and offset such that sun is located in a fixed orientation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
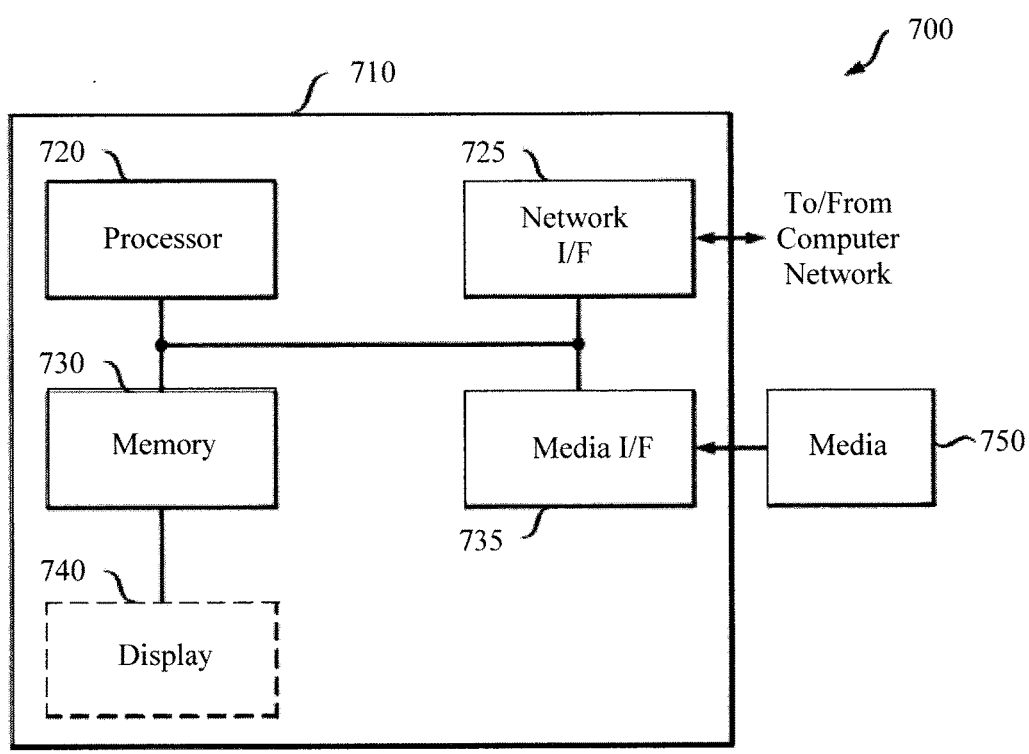
FIG. 7 is a diagram illustrating an exemplary apparatus for performing one or more of the methodologies presented herein according to an embodiment of the present invention.

Turning now to FIG. 7, a block diagram is shown of an apparatus 700 for implementing one or more of the methodologies presented herein. By way of example only, apparatus 700 can be configured to implement one or more of the steps of methodology 100 of FIG. 1.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for forecasting solar insolation, the method comprising the steps of:
   obtaining color whole sky images using a digital camera, wherein the color whole sky images are taken at different times, and wherein an image of a solar disk is present in at least one of the color whole sky images;
   creating sky transparency images from the color whole sky images;
   determining atmospheric solar scattering based on a width of the solar disk in the color whole sky images;
   determining cloud motion trajectories from a time series of the sky transparency images; and
   calculating the solar insolation as a function of time using the sky transparency, the atmospheric solar scattering, and the cloud motion trajectories.

2. The method of claim 1, wherein the color whole sky images are taken at a given time interval apart from one another, wherein the given time interval is from about 15 seconds to about 30 seconds, and ranges therebetween.

3. The method of claim 1, wherein the color whole sky images are taken using a predetermined exposure time.

4. The method of claim 3, wherein the predetermined exposure time is from about 0.1 milliseconds (ms) to about 0.5 ms, and ranges therebetween.

5. The method of claim 1, wherein the color whole sky images are taken using a sky camera system comprising at least one sky camera.

6. The method of claim 5, wherein the at least one sky camera comprises a digital camera.

7. The method of claim 6, wherein the digital camera is a charge coupled device (CCD) digital camera.

8. The method of claim 6, wherein the digital camera is a charge integrating device (CID) digital camera.

9. The method of claim 5, wherein the at least one sky camera system comprises a fisheye lens.

10. The method of claim 5, wherein the at least one sky camera system comprises a hemispherical mirror.

11. The method of claim 1, wherein the step of determining the sky transparency comprises the step of:
    determining a normalized difference between at least two color channels in one or more of the color whole sky images.

12. The method of claim 1, wherein the step of determining the sky transparency comprises the step of:
    determining a normalized difference of a blue color channel and a green color channel in one or more of the color whole sky images as $T(i,j)=A_{ij}*((B(i,j)-G(i,j))/(B(i,j)+G(i,j)))$, wherein $T(i,j)$ is the sky transparency at a point $(i,j)$ in the images, $B(i,j)$ is an intensity of the blue color channel at the point $(i,j)$ in the images, $G(i,j)$ is an intensity of the green color channel at the point $(i,j)$ in the images, and $A_{ij}$ is a fixed constant at the point $(i,j)$ in the images.

13. The method of claim 12, further comprising the step of:
    adjusting $A_{ij}$ for spatial variation in the color whole sky images.

14. The method of claim 1, wherein the step of determining the atmospheric solar scattering comprises the step of:
    comparing the color whole sky images with past color whole sky images for which the width of the solar disk in the past color whole sky images has been correlated with direct normal irradiance (DNI) to determine the atmospheric solar scattering based on the width of the solar disk in the color whole sky images.

15. The method of claim 1, wherein the step of determining the cloud motion trajectories comprises the steps of:
    locating minima in the sky transparency images, wherein the minima corresponds to clouds; and
    correlating the minima from an earlier sky transparency image in the time series to a later sky transparency image in the time series.

16. The method of claim 1, further comprising the step of:
    calculating the solar insolation as a function of time as $I(i,j,t)=S(i,j)*I0(t)+BK(i,j)$, wherein $I(i,j,t)$ is the solar insolation at a point $(i,j)$ in the images at a time $t$, $S(i,j)$ is the atmospheric solar scattering, $I0(t)$ is a solar intensity as a function of time, and $BK(i,j)$ is background scattering.

17. The method of claim 16, further comprising the step of:
    determining the solar intensity as a function of time $I0(t)$ as $I0(t)=T(ST(t))$, wherein T is the sky transparency and $ST(t)$ is a solar cloud motion trajectory as a function of time.

18. A system for forecasting solar insolation, comprising:
    a sky camera system comprising at least one digital camera configured to obtain color whole sky images taken at different times, wherein an image of a solar disk is present in at least one of the color whole sky images; and
    a computation facility configured to obtain the color whole sky images from the sky camera system, create sky transparency images from the color whole sky images, determine atmospheric solar scattering based on a width of the solar disk in the color whole sky images, determine cloud motion trajectories from a time series of the sky transparency images, and calculate the solar insolation as a function of time using the sky transparency, the atmospheric solar scattering, and the cloud motion trajectories.

19. The system of claim 18, wherein the digital camera is a CCD digital camera or a CID digital camera.

20. A non-transitory computer-readable program product for forecasting solar insolation, the computer-readable program product comprising a computer readable storage medium having program instructions embodied therewith which, when executed, cause a computer to:
    obtain color whole sky images taken using a digital camera, wherein the color whole sky images are taken at different times, and wherein an image of a solar disk is present in at least one of the color whole sky images;
    create sky transparency images from the color whole sky images;
    determine atmospheric solar scattering based on a width of the solar disk in the color whole sky images;
    determine cloud motion trajectories from a time series of the sky transparency images; and
    calculate the solar insolation as a function of time using the sky transparency, the atmospheric solar scattering, and the cloud motion trajectories.

* * * * *